Aug. 27, 1968 F. H. STARK 3,398,699
RECIPROCATING FLUID DISPLACEMENT DEVICE
Filed Jan. 5, 1966
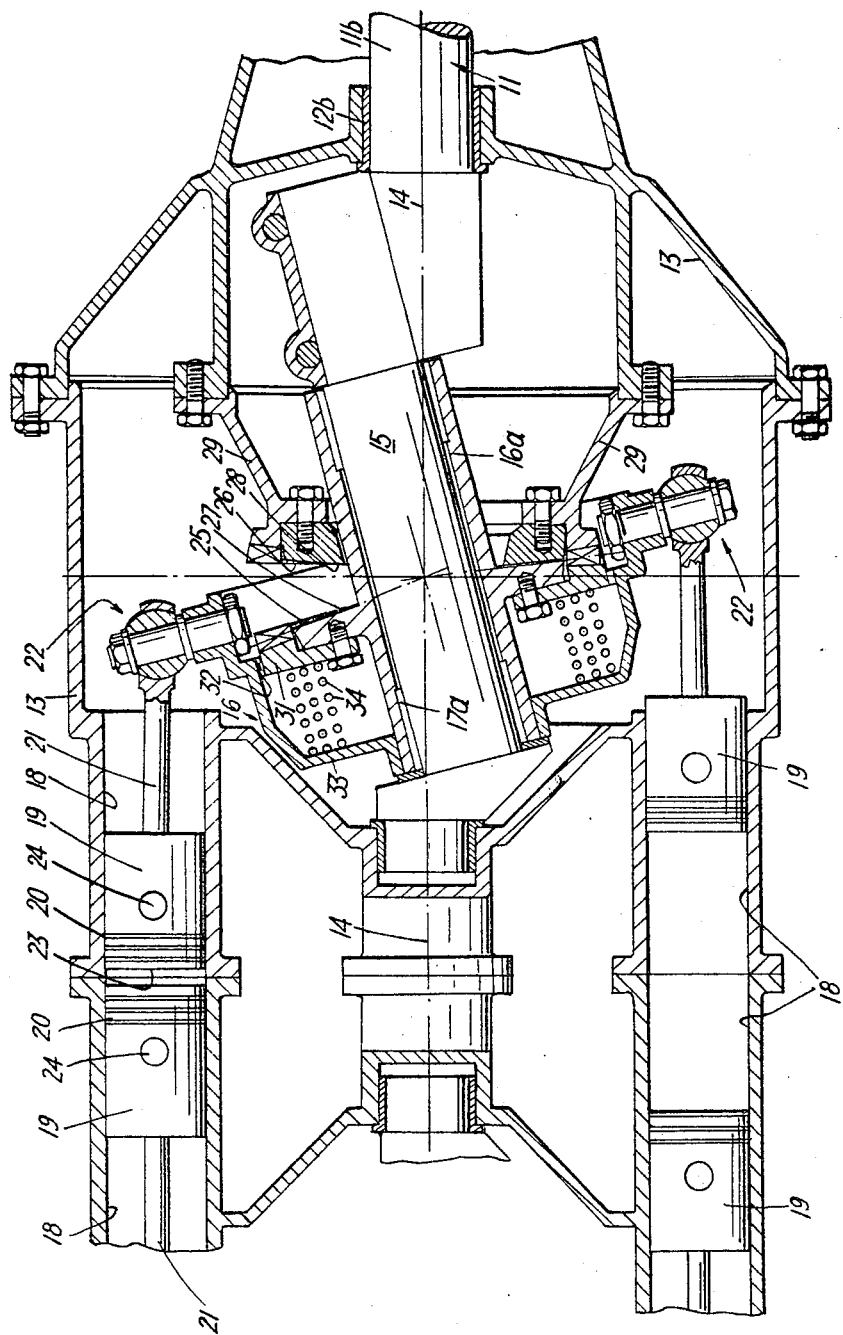

United States Patent Office 3,398,699
Patented Aug. 27, 1968

3,398,699
RECIPROCATING FLUID DISPLACEMENT
DEVICE
Frank Henry Stark, Derby, England, assignor to Rolls-Royce Limited, Derby, England, a British company
Filed Jan. 5, 1966, Ser. No. 518,957
Claims priority, application Great Britain, Jan. 28, 1965, 3,771/65
9 Claims. (Cl. 103—173)

ABSTRACT OF THE DISCLOSURE

The disclosure of this invention pertains to an apparatus operative as either an engine or as a pump in which a wobble plate arrangement actuates pistons which reciprocate in cylinders to move fluid therein.

The present invention relates to reciprocating fluid displacement devices which may, for example, be used either as an engine or as a pump.

According to the present invention, there is provided a reciprocating fluid displacement device comprising a housing, a shaft which has at least one part which is rotatably mounted in the housing to permit the shaft to be rotated about its longitudinal axis, the shaft having a portion connected to said part and inclined with respect to said longitudinal axis, a member having a first portion within which the said shaft portion is rotatable and a second portion mounted on the first portion, points on said second portion being free to perform lemniscate motions, a plurality of cylinders fixedly disposed in relation to the housing, a piston reciprocable in each said cylinder, universally movable means by means of which each respective piston is operatively connected to said second portion, reciprocation of said pistons being associated with the performance of said lemniscate motions, means for preventing relative rotation between the said second portion and the housing while permitting relative axial movement of the said second portion relative to the shaft portion to vary the compression ratio of the device, while maintaining the stroke of the piston substantially constant, the said member and the housing having cooperating surfaces which have rolling engagement with each other to transmit therebetween forces acting axially of the shaft, there being provided axial load transmitting means which cooperate with the said second portion to effect engagement between the said cooperating surfaces.

The said load transmitting means may comprise a resilient member.

The said second portion may be mounted on the said first portion for axial movement relative thereto.

The load transmitting means may be disposed between the said first and second portions.

The co-operating surfaces may be substantially conical, the apices of the conical surfaces being coincident on a point on the longitudinal axis of the shaft.

The means for preventing relative rotation between the said member and the housing may comprise a link mechanism but preferably comprises two rings of meshable bevel gear teeth, one ring mounted on the said member and housing respectively.

The universally movable means may comprise connecting rods opposite ends of each of which are coupled to the respective piston and to the said second portion, each connecting rod being permitted to swing in more than one plane.

Advantageously, there are two spaced parts of the shaft which are rotatably mounted in the housing, the said portion of the shaft extending between and being connected to said spaced parts.

In a preferred application, there are provided two devices according to the invention which are arranged back to back, the pistons of the two devices being reciprocable in common cylinders.

Fluid supplied to the cylinders may be supercharged by a pressure exchanger or turbo supercharger which is driven by a turbine through which the exhaust gases pass.

The invention is illustrated, merely by way of example, in the accompanying drawing which is a sectional view of the principal parts of one of the substantially identical halves of a reciprocating fluid displacement device according to the present invention.

A reciprocating fluid displacement device 10, which is constituted by an opposed piston wobble plate engine, has substantially identical left-hand and right-hand halves, of which the latter only is fully illustrated. The engine 10 comprises a shaft 11 having spaced parts 11a, 11b which are rotatably supported by bearings 12a, 12b respectively in a housing 13 so that the shaft 11 may be rotated about its longitudinal axis 14. The shaft 11 is formed with a portion 15 which extends between and is connected to the parts 11a, 11b and which is inclined with respect to the axis 14. A wobble plate 16 is mounted on a sleeve 16a which is supported on and mounted about the shaft portion 15 by bearings 17a, 17b which may be, for example, roller bearings, to permit relative rotation of the shaft portion 15 in the sleeve 16a and thus with respect to the wobble plate 16.

The wobble plate 16 has a portion 31 which is splined at 32 within a portion 33. The portion 33 may thus slide axially on the sleeve 16a. Springs 34 are disposed between the portions 31 and 33. The function of these springs will be apparent hereinafter.

The housing 13 is formed with a number of cylinders 18 (of which the right-hand portions and only part of the left-hand portions are illustrated) arranged in a circle about the axis 14 and with their axes substantially parallel to the axis 14. In each of the cylinders 18 there is disposed a reciprocable piston 19 having piston rings 20 and having an outer face 23. The corresponding left and right hand pistons 19 of each pair are thus reciprocable in a respective common cylinder constituted by the co-axial left and right hand cylinder portions 18. Each piston 19 is connected to the portion 33 of the wobble plate 16 by a connecting rod 21. Each connecting rod 21 is articulated to the wobble plate 16 by a universal-type coupling indicated generally by 22, and is operatively coupled to the piston face 23 through a ball-and-socket type joint (not shown).

The coupling between each connecting rod 21 and its piston 19 is effected through a universal joint 24 which has a spherical portion within the respective piston 19, the said spherical portion being received in a spherical socket of the connecting rod 21 whereby to provide universal accommodation of the movements of the wobble plate 16 during operation of the engine 10.

The portion 31 of the wobble plate 16 is provided with bevel gear teeth 25 which mesh with bevel gear teeth 26 on a part of the housing 13 and thereby prevent rotation of the wobble plate 16 relative to the housing 13. The inclined disposition of the shaft portion 15 enables the shaft portion 15 to function analogously to a crank when the shaft 11 is rotated, and during rotation thereof points on the wobble plate 16 execute a lemniscate or figure-of-eight wobbling motion about the axis 14 when the wobble plate 16 is restrained against rotation as aforesaid. Thus, during rotation of shaft 11, the motion communicated from the wobble plate 16 through couplings 22 and connecting rods 21 to the pistons 19 results in a linear reciprocating movement of the latter in the cylinders 18. Similarly, linear reciprocating movement of the pistons 19 in their cylinders 18 causes the said lemniscate motion and rotation of the shaft 11.

The pitch cones of the bevel gear teeth 25, 26 have a common apex at point A at the intersection of the axis 14 with the axis of the shaft portion 15.

It will be seen that the uppermost piston 19 as illustrated is at a position in its cylinder 18 corresponding to top-dead-centre (T.D.C.), while the lowermost piston 19 is at a position corresponding to bottom-dead-centre (B.D.C.).

When a fluid under pressure (generated, for example, by combusting an oil fuel with air) is confined in one or more of the cylinders 18 by a piston 19 at or just after T.D.C. (i.e., the uppermost piston 19 as shown), the thrust parallel to axis 14 is communicated to the wobble plate 16 through connecting rod(s) 21 and coupling(s) 22 to the wobble plate 16 tending to push it toward a position which will bring the respective piston 19 to B.D.C. Since the wobble plate 16 is constrained against rotation relative to housing 13 by the intermeshing teeth 25, 26, the effect of the push from the piston(s) 19 is to turn the shaft portion 15 about the axis 14 and thereby to rotate the shaft 11 about the axis 14. The direction of rotation of shaft 11 is determined, as in "conventional" reciprocating piston and crankshaft engines, by the timing of the valving means (not shown) for the pressure fluid in cylinders 18 which may, in turn, be regulated by the pistons 19, the time of initiation of combustion by spark or compression-ignition of the fuel air mixture in cylinders 18, and the subsisting state of rotation of the shaft 11.

It is not desirable that the loads from the pistons 19 in directions parallel to axis 14 should be transmitted to the housing 13 via the bearings 17a, 17b and the bearings 12a, 12b since this would necessitate the provision of expensive, large and specialised high load-resisting bearings at 12a, 12b, 17a, 17b. The portion 31 of the wobble plate 16 is therefore provided with a substantially conical surface 27 which cooperates with a substantially conical surface 28 of a part 29 of the housing 13 such that when the wobble plate 16 is undergoing its motion during operation of the engine 10, the surface 27 can roll over surface 28. The apices of the conical surfaces 27, 28 are coincident at a point A on axis 14.

One or both of the surfaces 27, 28 may be formed with a slight curvature in section giving improved rolling contact.

Alternatively, the surfaces 27, 28 may be curved in section. Thus they may be part-spherical surfaces having differing radii of curvatures, or they may be part toroidal shaped surfaces centred on point A and having identical or similar curvatures. It is also contemplated that one of surfaces 27, 28 may be an internal conical surface.

The springs 34, which are mounted between the portions 31 and 33, urge the wobble plate portion 31 in a direction to effect engagement of the surfaces 27, 28. It will be appreciated that the springs 34 will maintain the optimum maximum desired pressure in the cylinders 18 and that the compression ratio will depend on the rate of the springs 34. Thus the compression ratio may be altered by altering the springs 34 employed.

The springs 34 of the two halves of the engine may have the same or different rates and the same or different loading.

Since the thrust loads imparted to the bearings 12a, 12b, 17a, 17b from the pistons 19 is by a virtue of the provision of the surfaces 27, 28, relatively small, these bearings may be of any type, including plain journal bearings, which are capable of rotatably supporting the shaft 11 and the wobble plate 16.

The device according to the invention may be adapted for use either as a fluid pump, or as an engine which may be a spark or compression ignition engine, and may be of the opposed piston type as described above or fitted with fixed cylinder heads. The device may additionally be adapted to use the pistons 19 in a double acting sense so that it may operate as a fluid pump or engine.

The fluid supplied to the cylinders 18 could be supercharged by means of a pressure exchanger or a turbo-supercharger. The latter may, moreover, be driven by exhaust gases from the engine after these gases have been reheated. The said pressure exchanger or turbo supercharger may be driven by a turbine through which the exhaust gases of the engine may pass to remove pressure energy therefrom.

I claim:

1. A reciprocating fluid displacement device comprising a housing, a shaft which has at least one part which is rotatably mounted in the housing to permit the shaft to be rotated about its longitudinal axis, the shaft having a portion connected to said part and inclined with respect to said longitudinal axis, a member having a first portion within which the said shaft portion is rotatable and a second portion mounted on the first portion, points on said second portion being free to perform lemniscate motions, a plurality of cylinders fixedly disposed in relation to the housing, a piston reciprocable in each said cylinder, universally movable means by means of which each respective piston is operatively connected to said second portion, reciprocation of said pistons being associated with the performance of the said lemniscate motions, means for preventing relative rotation between the said second portion and the housing while permitting the said lemniscate motions to occur, means for permitting relative axial movement of the said second portion relative to the shaft portion to vary the compression ratio of the device, while maintaining the stroke of the piston substantially constant, the said member and the housing having cooperating surfaces which have rolling engagement with each other to transmit therebetween forces acting axially of the shaft, there being provided axial load transmitting means which cooperate with the said second portion to effect engagement between the said cooperating surfaces.

2. A device as claimed in claim 1 in which the said cooperating surfaces are substantially conical, the apices of the conical surfaces being coincident on a point on the longitudinal axis of the shaft.

3. A device as claimed in claim 1 in which the means for preventing relative rotation between the said member and the housing comprises two rings of meshable bevel gear teeth, one ring mounted on the said member and the other ring mounted from the housing.

4. A device as claimed in claim 1 in which the universally movable means comprises connecting rods opposite ends of each of which are coupled to the respective piston and to the said second portion, each connecting rod being permitted to swing in more than one plane.

5. A device as claimed in claim 1 in which there are two spaced parts of the shaft which are rotatably mounted in the housing, the said portion of the shaft extending between and being connected to said spaced parts.

6. A device as claimed in claim 1 in which there are two said devices which are arranged back to back, the corresponding pairs of pistons of the two devices being reciprocable in respective common cylinders.

7. A device as claimed in claim 1 wherein the said load transmitting means comprises a resilient member.

8. A device as claimed in claim 1 wherein the said second portion is mounted on the said first portion for axial movement relative thereto.

9. A device as claimed in claim 1 wherein the load transmitting means is disposed between the said first and second portions.

(References on following page)

References Cited
UNITED STATES PATENTS

| | | | |
|---|---|---|---|
| 1,582,076 | 4/1926 | Pnge | 74—60 |
| 2,251,543 | 8/1941 | Hulsebos | 123—58 X |
| 2,451,455 | 10/1948 | Willson | 74—60 |
| 2,569,559 | 10/1951 | Peuillers | 74—60 |
| 2,737,055 | 3/1956 | Dauben | 74—60 |
| 2,915,014 | 12/1959 | Morris | 103—38 |
| 2,918,012 | 12/1959 | Lucien | 103—173 |
| 3,101,621 | 8/1963 | Bunyan | 74—60 |
| 3,257,855 | 8/1966 | Dangauthier | 103—173 X |
| 1,987,699 | 1/1935 | Moore | 123—48 |

FOREIGN PATENTS 696,744  8/1940  Germany.

WILLIAM L. FREEH, *Primary Examiner.*